United States Patent [19]

Schindler et al.

[11] 4,086,447

[45] Apr. 25, 1978

[54] ELECTRONIC HYBRID CIRCUIT FOR CONNECTING A TWO-WIRE LINE TO SWITCHING SYSTEM

[75] Inventors: Hans Rudolf Schindler, Langnau; Peter Vettiger, Thalwil, both of Switzerland

[73] Assignee: International Business Machines Corporation, Armonk, N.Y.

[21] Appl. No.: 769,247

[22] Filed: Feb. 16, 1977

[30] Foreign Application Priority Data

Mar. 2, 1976 Switzerland .................... 2548/76

[51] Int. Cl.² ............................................. H04B 1/58
[52] U.S. Cl. ............................................. 179/170 NC
[58] Field of Search ......... 179/170 R, 170 NC, 170 T

[56] References Cited

U.S. PATENT DOCUMENTS

| | | | |
|---|---|---|---|
| 3,410,961 | 11/1968 | Slana | 179/18 FA |
| 3,855,430 | 12/1974 | Colardelle et al. | 179/170 NC |
| 3,886,322 | 5/1975 | Colardelle et al. | 179/170 NC |
| 3,909,559 | 9/1975 | Taylor | 179/170 NC |
| 3,970,805 | 7/1976 | Thomas | 179/170 NC |
| 3,987,257 | 10/1976 | Place | 179/170 NC |
| 4,004,109 | 1/1977 | Boxall | 179/170 NC |

Primary Examiner—Kathleen Claffy
Assistant Examiner—Randall P. Myers
Attorney, Agent, or Firm—John B. Frisone

[57] ABSTRACT

This invention comprises a telephone hybrid circuit having two opto-coupler arrangements for transferring voice signals from the two-wire line to a port of the switching system on one hand and from a port of the switching system to the two-wire line on the other hand. In addition, a pair of feeder circuits in the form of current sources comprising active elements are provided for feeding a constant positive direct current to one wire of the two-wire line and a negative direct current of equal magnitude to the other wire of the two-wire line. Each of the current sources includes control circuitry for maintaining a constant ratio between the current furnished by the current source and a control current common to both current sources. A control current path is connected to the output of one of the opto-coupler arrangements for generating a common control current in response to a dc signal and a superimposed voice signal received from a port of the switching system. The other opto-coupler arrangement couples the signals from the two-wire line to a port of the switching system.

11 Claims, 1 Drawing Figure

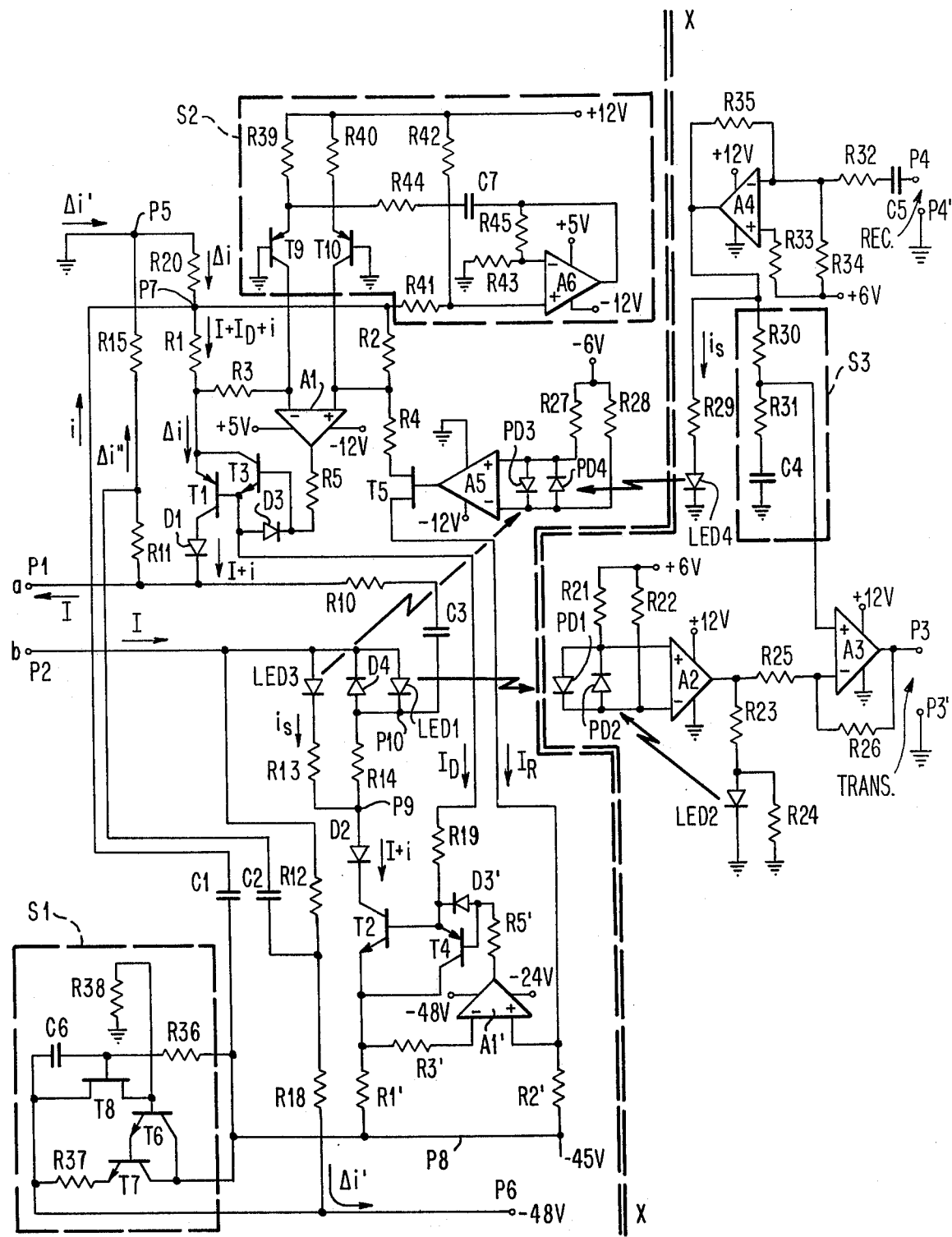

ELECTRONIC HYBRID CIRCUIT FOR CONNECTING A TWO-WIRE LINE TO SWITCHING SYSTEM

BACKGROUND OF THE INVENTION

The invention is concerned with a hybrid-line circuit for connecting a two-wire line to a four-wire switching system.

In telephone networks a hybrid-line circuit is required for connecting each two-wire line to the four wires of a switching center, that circuit providing transfer of voice signals in both directions, providing line termination impedance, providing high voltage separation from the switching center, and fulfilling a number of other functions. The main component of the hybrid line circuit in use today is a transformer which provides many of the necessary functions (signal transfer, electrical separation, symmetric feeding). Because of its simplicity and flexibility the transformer is particularly useful for this application and it has proven to be a reliable component.

But the use of transformers also has disadvantages. These include particularly its space requirements which prevent the high packing density of circuit cards now usual in modern equipment, as well as its cost. It is, therefore, desirable to eliminate the use of transformers in hybrid line circuits. It has previously been suggested that high-voltage capacitors be used for signal transfer. However, rather large capacitors were required, and, furthermore, these solutions did not provide for a very good rejection of common-mode signals.

It has heretofore been proposed that isolation between the lines and the central equipment can be provided at a substantial reduction in both size and cost through the use of optical couplers. U.S. Pat. No. 3,987,257, issued Oct. 19, 1976, utilizes a light-emitting diode and a phototransistor connected in series in each wire of a two-wire line, a pair of photo-transistors connected in series in one wire of the four-wire line, and a pair of light-emitting diodes connected in series in another wire of the four-wire line. Optical coupling between the two-wire and four-wire lines is provided by light generated within the light-emitting diodes and received by the photo-transistors of the respective two-wire and four-wire lines.

One of the difficulties believed to reside in such an arrangement is matching the transfer characteristics of the optical couplers used so that signals to or from the two-wire line are symmetrical. The transfer characteristics of such opto-couplers also may vary with temperature and age, causing further non-symmetry.

It is an object of the present invention to provide a circuit arrangement using opto-couplers which has the advantages of high voltage protection of the switching system (up to ± 1500V) and medium voltage protection of the hybrid-line circuit itelf (up to 300V), stable insertion loss in both transfer directions, high return loss (20 dB at 600Ω source impedance, high earth symmetry independent of frequency, high longitudinal balance of outgoing signals, and low idling noise. Furthermore, cross-talk over the battery is prevented because almost no voice signal current flows through the battery. The disclosed hybrid circuit further provides line termination at 600Ω and the necessary 2-to-4 wire conversion.

In addition, selection of the opto-couplers in the incoming and outgoing paths is less critical in the present invention compared to the above identified patented circuit. Also, the arrangement is less sensitive to temperature and aging effects with influence gain and linearity.

BRIEF SUMMARY OF THE INVENTION

The invention comprises a hybrid-line circuit for optically coupling a two-wire line to the four wires of a switching system. A first opto-coupler arrangement is provided for transferring voice signals from the two-wire line to a port of the switching system. A second opto-coupler arrangement is provided for transferring voice signals from a port of the switching system to the two-wire line. A pair of feeder circuits in the form of current sources comprising active elements are provided, one such circuit feeding a constant positive direct current to one wire of the line and the other feeding a constant negative direct current of equal magnitude to the other wire of the line. Each of the current sources includes control circuitry for maintaining a constant ratio between the current furnished by the current sources and a control current common to both sources. A control current path is connected to the output of one of the opto-coupler arrangements for generating a common control current in response to a received dc signal and a superimposed voice signal.

BRIEF DESCRIPTION OF THE DRAWING

The drawing shows a schematic diagram of an embodiment of the invention.

DETAILED DESCRIPTION

(a) General

In the drawing, terminal points P 1 and P 2 are connected to the a-wire and the b-wire of the two-wire line and are adapted to be connected to a telephone handset (not shown). Terminal points P 3, P 3', P 4 and P 4' are respectively connected to the two leads of an input port and to the two leads of an output port of the switching system (not shown). For each subscriber station of the switching system, one such hybrid-line circuit (LC) is provided.

The LC provides the following functions:

Termination of the two-wire line by a given impedance,

Power supply to the two-wire line and thus to the subscriber station,

Transfer of voice signals as well as signaling and status signals from the two-wire line to the switching system and vice versa, High voltage separation between the line and the switching system, Two-wire/four-wire conversion.

Terminal points P 5 and P 6 of the LC are connected to the terminal lines (ground, −48V) of a DC power supply for feeding power to the subscriber station.

With the aid of opto-electronic coupling devices the LC is separated into two parts which are electrically isolated from each other. In the figure, this separation is represented by a dashed double line X—X. This complete electrical isolation provides high-voltage protection of the part on the right, and thus of the complete switching system, against voltages up to several kV, which can occur in the part on the left side.

The functional groups of the hybrid-line circuit LC will now be presented, first in their structure (components, connections) and then in their operation.

(b) Current Sources

Feeding of DC power to the a-wire and b-wire of the two-wire line is effected by two feeder circuits which are constituted by constant current sources which comprise active elements and operate absolutely symmetrically. One of the current sources connects terminal point P 1 to circuit point P 7.

It consists of the following elements: a series connection of a resistor R 1, a transistor T 1, and a diode D 1, which is connected to P 1 (i.e., the a-wire); a complementary transistor T 3, which constitutes together with T 1 a Darlington circuit (emitter T 1 to collector T 3, base T 1 to emitter T 3); a diode D 3, which is connected between base and emitter of T 3; an operational amplifier A 1, the output which is connected to the base of T 3 (and one side of D 3) by a resistor R 5. The positive input of amplifier A 1 is the control input; it is connected through to circuit point P 7 by a resistor R 2. The negative input of amplifier A 1 is connected to the emitter of transistor T 1 by a resistor R 3. The potentials of the operational voltage for A 1 are +5V and −12V, respectively. A1, R3, and R5 together with R1 and R2 constitute a current control means for controlling the magnitude of the current supplied by this current source. Circuit point P 7 is connected to ground potential of the DC power supply, (point P 5) by a resistor R 20.

The second current source connects circuit point P 9 (which is in connection to terminal point P 2 through a network of diodes and resistors) to circuit point P 8. The structure of the second current source is analogous to that of the first current source. It consists of the following elements: a series connection of a resistor R 1', a transistor T 2 and a diode D 2, which is connected to P 9 (transistor T 2 being complementary to transistor T 1 of the first current source); a transistor T 4 which is complementary to T 2 and which constitutes together with T 2 a Darlington circuit (emitter T 2 to collector T 4, base T 2 to emitter T 4); a diode D 3', which is connected between base and emitter of T 4; an operational amplifier A 1', the output of which is connected to the base of T 4 (and one side of D 3') by a resistor R 5'. The positive input of amplifier A 1' is the control input; it is connected to point P 8 by a resistor R 2'. The negative input of amplifier A 1' is connected to the emitter of transistor T 2 by a resistor R 3'. Amplifier A 1' together with resistors R 1', R 2', R 3', R 4', and R 5' are the current control means which control the magnitude of the current of this current source. The potentials of the operational voltage of A 1' are −24V and −48V, respectively. Circuit point P 8 is connected to the −48V potential of the DC power supply (point P 6) by a special circuit S 1, which constitutes an active inductivity (gyrator) and will be described in more detail later.

The following transversal connections exist between the two feeder circuit current sources and the two terminal sides of the power supply, respectively: the positive inputs (control input) of the two operational amplifiers A 1 and A 1' are connected through a resistor R 4 and a field-effect transistor T 5; thus, there exists between points P 7 and P 8 a control current path which consists of the series connection of R 2, R 4, the current conducting channel of T 5, and R 2'. The providing of a control signal to the gate of T 5 by an operational amplifier A 5 will be described later.

Circuit points P 7 and P 8 are also connected to each other through a capacitor C 1. Between points P 1 and P 5 there is connected a series circuit of two resistors R 11 and R 15, and between points P 2 and P 6 there is connected a series circuit of two resistors R 12 and R 18. The two junction points of R 11 and R 15 on one hand and R 12 and R 18 on the other hand are connected by a capacitor C 2. A further transversal connection exists between the base of transistors T 1 and T 2 through a resistor R 19.

The connection between point P 9 (second current source) and point P 2 (b-wire) is constituted by the following network: series connection of resistor R 13 and light-emitting diode LED 3 between P 9 and P 2; in parallel thereto a series connection of resistor R 14 and two parallel diodes: a normal diode D 4 and a light-emitting diode LED 1. The connection point between R 14 and the two diodes D 4 and LED 1 is designated as P 10.

The terminal impedance of the two-wire line is constituted first by a resistor R 10 and a capacitor C 3, which as a series circuit connects points P 1 and P 10 to each other, and second, by the elements R 11, C 2, and R 12, which were mentioned already and which are connected between points P 1 and P 2 in series.

(c) Operation of the Feeder Circuit Current Sources in Direct Current Mode

Operation of the symmetric current sources, components of which were presented above, will now be described.

A constant current I is injected through transistor T 1 and diode D 1 via point P 1 into the a-wire. A current of equal magnitude but opposite polarity is injected through transistor T 2 and diode D 2 via point P 2 into the b-wire. A resistor network (R 11, R 15 and R 12, R 18) which connects the a-wire (P 1) to ground and the b-wire (P 2) with the potential of −48V is located in parallel to the current sources. This resistor network prevents a large deviation of the voltage bias on the two-wire line which could be established due to a small mismatch between the positive and the negative current source. The resistor values are chosen so large (4kΩ) and the tolerance values are chosen so small (each ± 1%) that the rejection of common-mode signals on the two-wire line is still high enough for satisfactory operation.

Further details will now be illustrated in connection with one of the current sources (between P 1 and P 7). Current I which flows into the a-wire is determined by the control current $I_R$, by the ratio between the two resistors R 1 and R 2, and by the bias current $I_D$. Operational amplifier A 1 compares the voltages over R 1 and R 2, which are proportional to the current $(I + I_D)$ and $I_R$, respectively. The output of amplifier A 1 controls the Darlington circuit comprising T 1 and T 3 so that the ratio of the currents through R 1 and R 2 remains constant.

A Darlington configuration was chosen because the base current is a source of inaccuracy; the particular arrangement of transistors allows, however, the use of only one high-voltage transistor (T 1 or T 2, respectively) for each of the two current sources.

The second current source between P 8 and P 9 is a mirror image of the first one. Resistors R 1' and R 2' are identical to resistors R 1 and R 2. The match between the two current sources depends (in first approximation) only on the relative tolerances of these four resistors. The control current $I_R$ is controlled by field-effect transistor T 5, the gate current of which is so small that the currents through R 2 and R 2' are almost identical. The currents through R 1 and R 1' will also be almost identical. As the bias current $I_D$ of both Darlington circuits is identical, the currents I which both current sources furnish to the two wires of the two-wire line are identical.

(d) Further Circuit Components

The other elements of hybrid-line circuit LC, which elements are used for the transfer of signals between the two-wire line and switching system will now be described.

As was mentioned already, the transfer of signals is effected by opto-electronic couplers. For each transfer direction a matched pair of opto-couplers is provided. The first pair consists of light-emitting diodes LED 1 and LED 2 and photodiodes PD 1 and PD 2. Light-emitting diode LED 1 is connected to circuit points P 2 and P 10. The two photo-diodes PD 1 and PD 2 are reversely poled and connected in parallel with the two inputs of an operational amplifier A 2. The two inputs are each connected through a resistor R 21 and R 22, respectively, to a potential of +6V. The potentials of the operational amplifier voltage are +12V and ground. Between the output of amplifier A 2 and ground a series connection of a resistor R 23 and the light-emitting diode LED 2 is provided. A resistor R 24 is connected in parallel to light-emitting diode LED 2.

A further operational amplifier A 3 is provided, the negative input of which is connected through a resistor R 25 to the output of amplifier A 2. The output of amplifier A 3 is connected to terminal point P 3, i.e., to one input port of the switching system. A feedback resistor R 26 connects the output of A 3 with its negative input. The positive input is connected to the signal path, which connects the output port of the switching system (P 4) to the two-wire line. This connection is important for two-wire/four-wire conversion and will be described in more detail further below.

The output signal path includes a second pair of matched opto-couplers consisting of light-emitting diodes LED 3 and LED 4 and photodiodes PD 3 and PD 4. Light-emitting diode LED 3 is located in a connection path between circuit points P 2 and P 9. The two photodiodes PD 3 and PD 4 are reversely poled and connected in parallel with the two inputs of an operational amplifier A 5, the output of which is connected to the gate electrode of field-effect transistor T 5 which, as was mentioned already, is located in the control current path between resistors R 2 and R 2'. The two inputs of A 5 are connected through resistors R 27 and R 28 to a potential of −6V.

A further operational amplifier A 4 is provided, the output of which is connected through two parallel paths to ground. One path includes a resistor R 29 and light-emitting diode LED 4, the other includes two resistors R 30 and R 31 and a capacitor C 4. The junction point between R 30 and R 31 is connected to the positive input of amplifier A 3. The negative input of operational amplifier A 4 is connected through resistor R 32 and a capacitor C 5 to terminal point P 4, i.e., to one output port of the switching system. Both inputs of A 4 are connected through a resistor R 33 and R 34 to a potential of +6V. Between the output of amplifier A 4 and its negative input there is provided a feedback resistor R 35.

(e) Operation for Voice Signal Transmission

For transmitting voice signals the described elements cooperate in the following way. (i) Transfer from the two-wire line to the switching center: resistors R 10, R 11, and R 12 constitute the termination of the two-wire line. Together with capacitors C 2 and C 3 they are equivalent to the series connection of a 600 Ω resistor and a large capacitor. Light-emitting diode LED 1 of one opto-coupler of the first pair of opto-couplers is connected in series with R 10. Its dynamic resistance is very small (4 Ω) in comparison to R 10.

The signal current (voice signal) flowing on the two-wire line is separated into two branches: one branch comprising R 10, C 3, and LED 1, and another branch comprising R 11, C 2, and R 12. The ratio of the two partial currents is mainly dependent on the resistors R 10, R 11, and R 12, and thus can be predetermined by the selection of the resistor values.

The voice current flowing through R 10 and LED 1 modulates the light output of the light-emitting diode; this light is received by photodiode PD 1 and generates a signal voltage. This voltage is amplified by operational amplifier A 2 which drives light-emitting diode LED 2 of the other opto-coupler of the first pair of opto-couplers. The light emitted by LED 2 modulates the voltage from photodiode PD 2 which is connected antiparallel with PD 1. Amplification by A 2 results in the generated voltages of both photodiodes being equal. As the two opto-couplers of the pair were selected so they match each other, the output signal of amplifier A 2 is exactly proportional to the voice signal current on the two-wire line. Though the signal levels may be different, their ratio is stable even with changes in temperature. The second operational amplifier A 3 transfers the voice signal to terminal point P 3 which is connected to one input port of the switching system.

(ii) Transfer from the switching center to the two-wire line: For this transfer direction a second matched pair of opto-couplers is provided. Voice signals furnished by the switching system are fed through terminal point P 4 and C 5 and R 32 to operational amplifier A 4, the output signal of which modulates the light intensity of light-emitting diode LED 4. The emitted light of the latter modulates the signal generated by associated photodiode PD 4. The signal is amplified by operational amplifier A 5, the output signal of which controls the gate electrode of field-effect transistor T 5 and thus the control current $I_R$ through resistors R 2 and R 2'. Because the currents of both feeder circuit current sources exactly follow the control current, the voice signal furnished by the switching system is thus superimposed on the DC feeding current; the voice signal is "injected" through the current sources into the two-wire line, and this is done in an exactly symmetrical way.

The signal current of the lower current source (between P 8 and P 9) is distributed to two branches including the resistors R 13 and R 14, respectively. The signal current through R 13 also flows through light-emitting diode LED 3 of the other opto-coupler of the second pair of optocouplers as well as through the b-wire of the two-wire line. The signal current through R 14 flows mainly through C 3 and R 10; a small fractional part, however, flows through LED 1 to the b-wire (see description below under "two-wire/four-wire conversion"). The signal current through the upper current source (between P 1 and P 7) is also distributed: one part flows into the a-wire of the line, the other part flows through R 10 and C 3 to point P 10.

The current which flows through light-emitting diode LED 3 and which is injected into the b-wire modulates the light intensity of LED 3 and thus the voltage from the associated photodiode PD 3. The result is that the signal current $i_s$ flowing through LED 4 is proportionally regenerated in LED 3 and thus in the extension line. Signal current i flowing through the lower current source is, however, of double the magnitude of the signal current ($i_s$) which is furnished through LED 3 to the line. This is not only valid for the voice signal current but also for the DC feeding current which is partially furnished through R 13 and partially through R 14 to the b-wire.

The alternating signal current (voice signal) from P 7 to P 8 does not close its path through the DC power source but rather flows through capacitor C 1 from P 8 back to P 7. In this way cross-talk over the battery resistance is prevented. A gyrator circuit (active inductivity) S 1 which will be described in more detail below, prevents in any way closing of the voice current path through the battery.

The following can be said for the operation of the light-emitting diodes of the opto-coupler pairs: in the disclosed circuit arrangement the line current of the two-wire line, i.e., particularly DC feeding current, determines the operational point of the light-emitting diodes. Thus, no specific biasing current is necessary for this purpose. The result is that for operation of the light-emitting diodes almost no additional power is required. The level of the basic current (12 mA) is small enough to prevent a reduction in the lifetime of the opto-couplers, but large enough to achieve a high dynamic range for the transmitted signals.

(f) Active Inductivity (Gyrator Circuit)

Circuit S 1 between circuit points P 6 and P 8 has the same effect as an inductor. It comprises a capacitor C 6, and active components (transistors) T 6, T 7 and T 8, and further resistors R 36, R 37, and R 38, which all cooperate to "translate" the capacity into an inductivity as seen from terminal points P 6 and P 8. Therefore, this circuit is also designated as a gyrator circuit.

Transistors T 6 and T 7 are connected in a Darlington configuration. Their collectors are connected in common to P 8; the emitter of T 6 is connected to the base of T 7. The base of T 6 is connected through resistor R 38 to ground; it is also connected through field-effect transistor T 8 to point P 6. The gate electrode of T 8 is connected through resistor R 36 to point P 8. Capacitor C 6 is connected between the gate electrode and drain electrode of field-effect transistor T 8. The emitter of T 7 is connected through a resistor R 37, also to P 6. This circuit S 1 operates with low voltages. It has a high output impedance, with an inductance value of several Henry.

(g) Balancing Circuit

As was described above, for the transfer of voice signals to the subscriber, a positive and a negative voice current are "injected" separate from each other into the a-wire and the b-wire. A small mismatch between these two currents would cause a longitudinal imbalance of the voice signal (voltage values) on the two-wire line. Such a mismatch would even be enhanced due to the fact that the impedance between the a-wire and the b-wire (300Ω) is smaller than the impedance between the combined a- and b-wires and ground (2000Ω).

In order to achieve full longitudinal symmetry of the voice signals on the two-wire line a special balancing circuit S 2 is provided which is shown in the upper part of the drawing (within a dashed line).

Circuitry S 2 comprises a transistor T 9, the collector of which is connected to the negative input of amplifier A 1 and the emitter of which is connected through a resistor R 39 to a potential of +12V. A second transistor T 10 is provided, the collector of which is connected to the positive input of amplifier A 1 and the emitter of which is connected through a resistor R 40 to a potential of +12V. The bases of both transistors are connected to ground. Balancing circuit S 2 further comprises an operational amplifier A 6, the positive input of which is connected through a resistor R 41 to circuit point P 7 and through a resistor R 42 to a potential of +12V. The negative input of A 6 is connected through a resistor R 43 to ground. The output of A 6 is connected through a capacitor C 7 and a resistor R 44 to the emitter of transistor T 9. The potentials of the operational voltage of A 6 are +5V and −12V, respectively. Finally, a feedback resistor R 45 is provided between the output and the negative input of amplifier A 6.

Balancing circuit S 2 operates as follows: assume that the voice current through one of the current sources is greater by the amount $\Delta i$ than the voice current through the other. This difference current is divided in circuit point P 1. A first portion $\Delta i'$ flows partially through the subscriber station and partially through R 10 and then through R 12, R 18, and the DC current supply to point P 5. A second portion $\Delta i''$ flows through R 11 and R 15 to point P 5. The total difference current $\Delta i$ flows through R 20 which results in a voltage drop. This voltage drop is amplified by amplifer A 6 and is furnished to the emitter of transistor T 9 and thus to the negative input of the amplifier A 1 in the current source. By suitable selection of the amplification values the difference current $\Delta i$ can thus be significantly reduced. The amplification in this feedback loop is determined by A 6, by T 9, and by A 1. Transistor T 10 is connected in parallel to transistor T 9 for compensating negative effects of temperature changes. Stability of the loop is achieved by suitable compensation (roll-off) of amplifier A 6.

Balancing circuit S 2 would not be necessary if components with narrower tolerance, e.g. 0.1%, were chosen for resistors R 1, R 2 and R 1', R 2'.

(h) Two-Wire/Four-Wire Conversation

The voice signal which is transferred from the switching system (terminal point P 4) to the subscriber must not be fed back to the input port of the switching system (terminal point P 3). This is prevented in the following way: Between circuit points P 1, P 2, P 9, and P 10 there exists a bridge circuit comprising the following resistors in the branches of the bridge:

P 1 – P 2: resistance of the subscriber station, and in parallel with that, series connection of R 11 and R 12.
P 2 – P 9: resistor R 13
P 9 – P 10: resistor R 14
P 10 – P 1: resistor R 10

Light-emitting diode LED 1 is located in the diagonal branch of the bridge between P 2 and P 10. Feeding (injection) of the voice signals is effected through the diagonal points P 1 and P 9 of the bridge. R 13 and R 14 are equal. The value of R 10 is 660Ω, and the two-wire line together with the subscriber station can be represented in first approximation by a resistance of 600Ω (in parallel to R 11 + R 12 = 6 kΩ). There exists a small mismatch in the bridge, so that only a small fraction of the voice output signal which is furnished to the bridge will flow through light-emitting diode LED 1 (diagonal branch). This signal is transferred through photodiode PD 1 and amplifier A 2 to the negative input of amplifier A 3. An identical signal is transferred from the output of amplifier A 4 through a simple balancing network S 3 (consisting of resistors R 30 and R 31 and capacitor C 4), which network has the effect of a voltage divider, to the positive input of amplifier A 3. In this way, the feedback voice output signal is compensated and thus is not again furnished to the input port (P 3). With this circuit arrangement, a high return loss can be achieved. No inductivity is required for the balancing network as contrasted to cases where coupling transformers were used and an additional inductivity had to be provided.

While the invention has been particularly shown and described with reference to preferred embodiments thereof, it will be understood by those skilled in the art that various changes in form and details may be made therein without departing from the spirit and scope of the invention.

What is claimed is:

1. In a communications network having a plurality of audio devices, a four wire switching network at a central location and a two-wire line connecting each audio device with said central location, a hybrid circuit for each two-wire line to connect said line to the four wires of said switching network, said hybrid circuit including a pair of regulated current sources providing a positive current to the one and a negative current to the other wire of said two-wire line, and said hybrid circuit further comprising:
   a single control current generating circuit common to said pair of regulated current sources,
   a current control means in each current source and responsive to a voltage furnished at an associated output of said control current generating circuit, said voltage being proportional to said common control current to control the current in its associated current source to be a constant multiple of said common control current,
   a first optocoupler device connected with its light-generating means to an output port of said switching network for receiving audio signals and connected with its light-responsive means to the input of an active element in said control current generating circuit, to enable generation of a common control current consisting of a direct current and a superimposed audio signal current, and
   a second optocoupler device connected with its light-generating means to said two-wire line for receiving audio signals and connected with its light-responsive means to an input port of said switching network.

2. A hybrid circuit as set out in claim 1 further characterized in that said control current generating circuit comprises:
   a voltage source having a positive and a negative terminal,
   a resistor connected at one end to said positive terminal and at its other end to said current control means for said positive current source,
   a second resistor connected at one end to said negative terminal of said voltage source and at its other end to said current control means for said negative current source,
   a circuit including a control transistor connecting said other ends of said resistors, and
   a transistor control circuit under control of said light-responsive means of said first optocoupler device to modulate the current in said control current generating circuit in accordance with the signal from said light-generating means of said first optocoupler device.

3. A hybrid circuit as set out in claim 1 and characterized in that said light-responsive means of said first optocoupler device includes:
   an operational amplifier controlling said current regulating circuit,
   a first photodiode responsive to light from said light-generating means of said first optocoupler device and connected across the input of said operational amplifier,
   a light-emitting diode generating a light signal modulated by the current from said current sources, and
   a second photodiode connected across the input of said operational amplifier in reverse poled relationship to said first photodiode and receiving the light from said light-emitting diode to provide a negative feedback circuit maintaining a linear relationship between the signal current in said current sources and said audio signal from said switching network port.

4. A hybrid circuit as set out in claim 3 and further characterized in that;
   one end of a first of said current sources is connected directly to one of said wires of said two-wire line,
   one end of the second of said current sources is connected to the other of said wires by a network comprising:
   said light-emitting diode and a resistor in series therewith,
   a second light-emitting diode in said light-generating means of said second optocoupler device,
   a second resistor in series with said second light-emitting diode, and
   a diode connected across said second light-emitting diode and poled reversely thereto,
   said two series circuits being in parallel between said one end of said second current source and the other wire of said two-wire line, and
   a terminating impedance comprising a resistance and a capacitance in series is connected between said one of said wires of said line and the junction between said second light-emitting diode and said second resistor.

5. A hybrid circuit as set out in claim 1 and characterized in the provision of an anti-crosstalk arrangement in said hybrid circuit, said arrangement comprising:
   a pair of resistors connected in series from one of said line wires to one pole of the DC power circuits,
   a second pair of resistors connected in series from the other of said line wires to the other pole of said DC power circuit, and
   a capacitor connected between the midpoints of said first and second pair of series connected resistors.

6. A hybrid circuit as set out in claim 5 and characterized in the provision of a second anti-crosstalk circuit, said second anti-crosstalk circuit comprising:

a capacitor connected between the power source terminals of said pair of current sources.

7. A hybrid circuit as set out in claim 1 and further characterized by the provision of a simulated inductance circuit in the circuit with one of said current sources, said simulated inductance circuit comprising:
 a pair of transistors in a Darlington connection between the source end of said current source and a pole of a power source,
 a resistor connected from the control base of said pair of transistors to the other pole of said power source to bias said transistors to an on state, and
 a control circuit for said pair of transistors, said circuit including a field-effect transistor from said control base to the pole of said power source and having its base connected to the midpoint of a resistor and capacitor series circuit across said pair of transistors.

8. A hybrid circuit as set out in claim 1 and further characterized in that each of said pair of regulated current sources includes:
 a first diode,
 a first transistor, and
 a first resistor, all connected in series between one of said line wires and a pole of the power source for said current sources,
 a current control means comprising an operational amplifier having one input connected to the junction between said resistor and said transistor, and a second input connected to said control current generating circuit, and
 a connection including a second resistor, a second transistor and a second diode from the output of said operational amplifier to the base of said first transistor.

9. A hybrid circuit as set out in claim 8 and further including:
 a resistor connected between the bases of said first transistors of said pair of current sources.

10. A hybrid circuit as set out in claim 1 and further characterized in that each said regulated current source includes:
 a first resistor,
 a first transistor, and
 a first diode connected in series between the associated pole of the power source for said current source and the associated wire of said two-wire line,
 a second transistor of an opposite conductivity type than said first transistor, having its collector connected to the emitter of said first transistor and its emitter connected to the base of said first transistor,
 an operational amplifier having its output connected to the base of said second transistor,
 a resistor connecting an input of said operational amplifier to the emitter of said first transistor, and
 a connection from the other input of said operational amplifier to said control current generating circuit.

11. A hybrid circuit as set out in claim 10 and further including in each current source,
 a diode connected between the emitter and base of said second transistor and being poled reversely to the base to emitter junction of said second transistor.

* * * * *